(12) United States Patent
Cheng (10) Patent No.: US 6,658,071 B1
(45) Date of Patent: Dec. 2, 2003

(54) DELAYED DECISION FEEDBACK LOG-MAP EQUALIZER

(75) Inventor: Jung-Fu Cheng, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/503,788

(22) Filed: Feb. 14, 2000

(51) Int. Cl.[7] .................................................. H03D 1/06
(52) U.S. Cl. ........................ 375/348; 375/233; 375/341; 375/346; 708/323; 714/795
(58) Field of Search ............................... 375/232, 233, 375/341, 346, 348, 350; 708/323; 714/795

(56) References Cited

U.S. PATENT DOCUMENTS

| | | | | |
|---|---|---|---|---|
| 5,517,527 A | * | 5/1996 | Yu ................................ | 375/233 |
| 5,796,782 A | * | 8/1998 | Sagawa ........................ | 375/296 |
| 5,933,462 A | | 8/1999 | Viterbi et al. | |
| 6,028,899 A | * | 2/2000 | Petersen ...................... | 375/341 |
| 6,044,116 A | * | 3/2000 | Wang .......................... | 375/265 |
| 6,118,816 A | * | 9/2000 | Meyer et al. ................. | 375/233 |

OTHER PUBLICATIONS

Qian, Xue–Cheng; Zhao, Chun–Ming; Cheng, Shi–Xin; "Reduced–state variant of optimum MAP equalizer," Electronics Letters, Sep. 16, 1999, vol. 35, No. 19., pp. 1611–1612.

Baccarelli, E.; Fasana, A.; Galli, S.; and Zucchi, A., "A Novel Reduced–Complexity MAP Equalizer Using SoftStatistics for Decision–Feedback ISI Cancellation," Global Telecommunications Conference–Globecom '99, pp. 2296–2300.

Hoeher, Peter and Lodge, John, Iterative Decoding/Demodulation of Coded DPSK Systems, IEEE, 1998, pp. 598–603.

Benedetto, S. and G. Montorsi. *Soft–Output Decoding Algorithms in Iterative Decoding of Turbo Codes, TDA Progress Report 42–124*, pp. 63–87, Feb. 15, 1999.

Hagenauer, Joachim and Peter Hoeher. *A Viterbi Algorithm with Soft–Decision Outputs and its Applications, Proceedings of IEEE*, Vol 47, No. 1, pp. 1680–1686, 1989.

Schalkwijk, J. Pieter and Karel A. Post. *Correction to "On the Error Probability for a Class of Binary Recursive Feedback Strategies", IEEE Transactions on Information Theory*, pp. 284–287, Mar. 1974.

Robertson, Patrick et al. *A Comparison of Optimal and Sub–Optimal MAP Decoding Algorithms Operating in the Log Domain, Proc. ICC*, pp. 1009–1013, nd.

Duel–Hallen, Alexandra et al. *Delayed Decision Feedback Sequence Estimation, IEEE Transactions on Communications*, Vol 37, No. 5, pp. 428–436, May 1989.

* cited by examiner

*Primary Examiner*—Don N. Vo
*Assistant Examiner*—Qutbuddin Ghulamali
(74) *Attorney, Agent, or Firm*—Coats & Bennett, P.L.L.C.

(57) ABSTRACT

A delayed decision feedback Log-MAP equalizer generates optimal soft information at the bit level for MPSK and MDPSK modulations over multipath fading channels. The algorithms have a forward-backward recursion structure similar to conventional Log-MAP algorithms. To reduce complexity, the forward recursion incorporates the techniques of delayed decision feedback sequence estimation to construct a reduced state space. The backward recursion then takes this state space as given, in that it does not hypothesize feedbacks, and computes required soft information.

17 Claims, 4 Drawing Sheets

DELAYED DECISION FEEDBACK LOG-MAP EQUALIZER

BACKGROUND OF THE INVENTION

The present invention relates generally to cellular and wireless communication and, more particularly, to an equalizer hypothesizing modulation symbols received over multipath fading channels.

Signals in a wireless communication system are subject to a number of phenomena that degrade signal quality. Each signal is reflected from many different man-made and natural objects. The receiver thus receives a number of signals delayed by one or more signal periods, called "multipath", as each reflected signal is received. If the period of delay is more than the time required to transmit one symbol, producing intersymbol interference (ISI), then a receiver decoder may not be able to decode the symbol. This can cause poor sound or data quality to the user. Many different algorithms are used at the receiver to attempt to compensate for such effects. These techniques are discussed, for example, by G. L. Stüber in *Principles of Mobile Communication*, Chapter 6, Kluwer Academic Publishers, 1996. One such algorithm is the maximum likelihood sequence estimation (MLSE) or "Viterbi" algorithm.

Digital cellular and personal communication systems based on IS-136 and GSM (global system for mobile communications) require equalization to handle ISI arising from time dispersion. With the advent of the high date rates and the high level modulation in EDGE (enhanced data rates for global evolution) systems, the extent of ISI has increased considerably. To cover the same delay spread as today's GSM, EDGE receivers are specified to resolve a 5-tap channel. Furthermore, these systems are convolutional coded. To enable soft-decision decoding, it is, therefore, highly desirable for the equalizers to produce soft information at the bit level.

For M-ary modulation, a traditional MLSE equalizer requires $M^L$ at each trellis stage in order to properly model an intersymbol interference (ISI) channel driven by L+1 M-ary phase-shift keying (MPSK) symbols. Because of the high computational and storage requirements this implies, the delayed decision feedback sequence estimation (DDFSE) equalizer uses a kind of hybrid of MLSE and DFE (decision feedback estimation) in which only the K+1 most recent symbols are hypothesized as part of the state model, while the remaining L–K symbols required to compute each path metrics are determines from the surviving paths of each state. Therefore, a trellis of only $M^K$ states is needed in this case and the L–K "DFE" symbols constitute side information of the states. DDFSE equalizers are discussed, for example, by A. Duel-Hallen and C. Heegard in "Delayed Decision Feedback Sequence Estimation," *IEEE Transactions on Communications*, vol. 37, no. 5, pp. 428–436, May 1989. One convenient way of describing the DDFSE operation is to say that the energy in the most recent K+1 "MLSE" symbols is used to equalize the data, while the energy in the remaining "DFE" symbols is simply canceled. The performance of DDFSE equalizers can be improved by pre-filtering the received signals with minimum-phase filters to maximize the energy of the leading ISI taps. Such filtering techniques are discussed, for example, in application Ser. No. 09/378,314 entitled "Method and Apparatus for Computing Prefilter Coefficients" of K. C. Zangi et al. and filed Aug 20, 1999.

In a convolutional coded system, a Log-MAP (maximum a posteriori) equalizer is preferred because of its ability to generate high-quality soft information for the Viterbi decoder. Traditional MAP algorithms, as described in L. R. Bahl, J. Cocke, F. Jelinek and J. Raviv (BCJR) in "Optimal Decoding of Linear Codes for Minimizing Symbol Error Rate," *IEEE Transactions on Information Theory*, vol. 20, pp.284–287, March 1974, are not very suited to practical implementation because these algorithms require many multiplication and logarithm operations. The Log-MAP algorithms circumvent this complexity problem by operating the signals in the logarithmic domain, as discussed, for example, by P. Robertson, E. Villebrun and P. Hoehner, in "A Comparison of Optimal and Sub-Optimal MAP decoding algorithms operating in the log domain," *Proceedings of IEEE International Communications Conference'95*, pp. 1009–1013, June 1995. However, both approaches are designed to generate optimal soft information for trellis with static state spaces, i.e., the definitions of the states do not change over time. Moreover, these definitions are known a priori and are usually given exogenously. For example, the trellis of a convolutional code falls into this category: the states are defined by the contents of the encoding shift-registers and the complete trellis can be constructed even before the codewords are transmitted. For multipath equalization, the traditional MAP algorithms thus require the construction of the complete state space as in the case for MLSE equalizers. For many practical applications, this proves to be excessively complex. For example, a MAP equalizer for 8PSK with 5 channel taps (EDGE specifications) requires 4096 states.

Since the Log-MAP equalizers suffer from the same complexity problems as the MLSE equalizers, it would be of great practical value if the principle of DDFSE could be combined with the Log-MAP algorithms to reduce complexity. An approach to this problem is discussed in the following.

Figure 1:
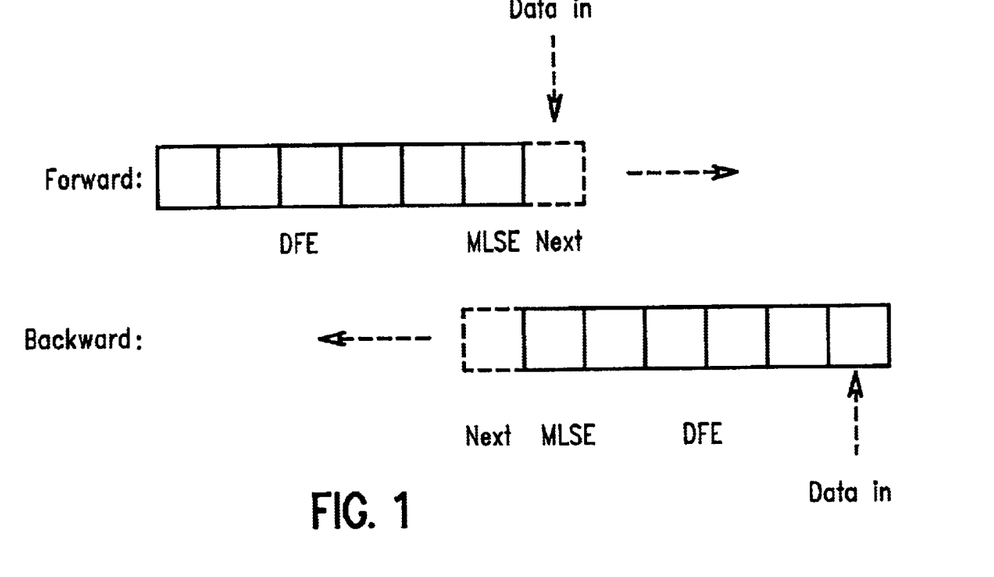
FIG. 1 illustrates state configurations for forward and backward recursions using a naive approach to combining DDFSE and Log-MAP algorithms.

Several problems arise when this MLSE/DFE hybrid method is applied to a forward-backward Log-MAP equalizer. More specifically, the forward DDFSE recursion would use an anti-causal prefilter to create a minimum-phase channel response. A DDFSE run backwards through the trellis, on the other hand, would need a causal prefilter to crease a maximum-phase channel, because in this case the MLSE symbols appear at the other end of the true state, as illustrated in FIG. 1. This results in two major issues:

1. The forward-backward Log-MAP algorithm breaks down. The two passes are now using two sets of data which are correlated with each other (because of the two prefilters with overlapping support). Because of this correlation, the Markovian property of the data sequence, which means that the future data symbols are independent of the past data symbols given the current state, no longer holds. This Markovian property plays an essential role in the derivation of the forward-backward algorithm, without which the Log-MAP algorithm is invalid.
2. The state space from the two recursions do not match. A complete state space is used in a Log-MAP equalizer, which guarantees the forward and backward recursions work on the same state space. On the other hand, for a naive delayed decision feedback Log-MAP equalizer, only the "MLSE" symbols can be matched up. The "DFE" symbols setup by the forward and backward recursions generally do not agree with each other. The overlapping supports of the two prefilters makes the situation even more confusing.

The definitions of the states in a DDFSE trellis are constructed endogenously by the equalization recursion itself and, therefore, become unknown a priori. The traditional MAP algorithms are thus not directly applicable in these situations. In order to extract soft information, ad hoc post-processing methods such as the soft-output Viterbi algorithms (SOVA) are usually used instead. The SOVA algorithm is discussed, for example, by J. Jagenauer and P. Hoehner in "A Viterbi Algorithm with Soft-Decision Outputs and its Applications," *Proceedings of IEEE Global Telecommunications Conference'89*, pp. 1680–1686, November 1989. These algorithms, however, are sub-optimal and their shortcomings become more apparent in iterative processing settings.

Accordingly, there is a need for an equalizer and method that generates optimal soft information at the bit level for MPSK and MDPSK modulations over multipath fading channels.

SUMMARY OF THE INVENTION

The present invention meets this need by providing a delayed decision feedback Log-MAP equalizer that generates optimal soft information at the bit level for MPSK and MDPSK modulations over multipath fading channels.

Broadly, there is disclosed in accordance with one aspect of the invention a method of hypothesizing modulation symbols received over multipath fading channels. An estimate of a received sequence of symbols is calculated and stored using stored channel coefficients and a previous state path history of modulation symbols. For each possible current state symbol, a branch metric is calculated and stored from a prior state to a current state using the calculated estimate of the received sequence of symbols. A forward recursion is performed by calculating a forward state metric using the branch metric from the prior state to the current state. A backward recursion is performed by calculating a backward state metric using the branch metric from the prior state to the current state.

It is a feature of the invention that the estimate of a received sequence of symbols calculated and stored using stored channel coefficients and a previous state path history of modulation symbols is implemented using a delayed decision feedback sequence estimation equalizer.

It is another feature of the invention that the estimate of a received sequence of symbols calculated and stored using stored channel coefficients and a previous state path history of modulation symbols is implemented using a maximum likelihood sequence estimation equalizer for most recent symbols in the sequence of symbols and using a decision feedback equalizer for remaining symbols in the sequence of symbols.

It is a further feature of the invention that a Log-MAP equalizer is used to calculate and store the branch metric, the forward state metric and the backward state metric.

It is yet another feature of the invention that a posteriori log-likelihood ratio of each bit in the hypothesized modulation symbols is calculated using the calculated forward state metric and the calculated backward state metric.

It is still another feature of the invention that the forward recursion is executed prior to the backward recursion.

It is still an additional feature of the invention that the backward recursion is executed prior to the forward recursion.

It is yet still another feature of the invention that the previous state path history of modulation symbols is updated using the calculated branch metric from a prior state to a current state using the calculated estimate of the received sequence of symbols.

It is still a further feature of the invention that the modulation symbols received over multipath fading channels comprise M-ary modulated symbols.

It is yet a further feature of the invention that the modulation symbols received over multipath fading channels comprise M-ary differential PSK modulated symbols.

There is disclosed in accordance with another aspect of the invention, in a receiver receiving modulation symbols transmitted over multipath fading channels, an equalizer including a programmed controller. The programmed controller calculates and stores an estimate of a received sequence of symbols using stored channel coefficients and a previous state path history of modulation symbols. A branch metric is calculated and stored for each possible current state symbol from a prior state to a current state using the calculated estimate of the received sequence of symbols. A forward recursion is performed by calculating a forward state metric using the branch metric from the prior state to the current state. A backward recursion is performed by calculating a backward state metric using the branch metric from the prior state to the current state.

There is disclosed in accordance with a further aspect of the invention a method of generating soft information at bit level of modulation symbols received over multipath fading channels. An estimate of a received sequence of symbols is calculated and stored using stored channel coefficients and a previous state path history of modulation symbols, each symbol comprising an M-ary modulated symbol representing select bits c. A branch metric for each possible current state symbol is calculated and stored from a prior state to a current state using the calculated estimate of the received sequence of symbols. A forward recursion is performed by calculating a forward state metric using the branch metric from the prior state to the current state. A backward recursion is performed by calculating a backward state metric using the branch metric from the prior state to the current state. A posteriori log-likelihood ratio of each select bit c in the estimated modulation symbols is calculated using the calculated forward state metric and the calculated backward state metric.

Particularly, a DDFSE method is incorporated with a forward recursion to construct a reduced state space. Starting with a complete state space, the $M^L$ states are partitioned into $M^K$ subsets. Each of the subsets consists of the $M^{(L-K)}$ states with the same K leading hypothesized symbols while the remaining L−K hypotheses are completely different. Since the minimum-phase prefilter shifts most of the energy to the leading taps, the last L−K hypotheses have little effect on the recursion metrics. To reduce computation, L−K decision feedbacks are then used to select one representative state for each subset.

Figure 2:
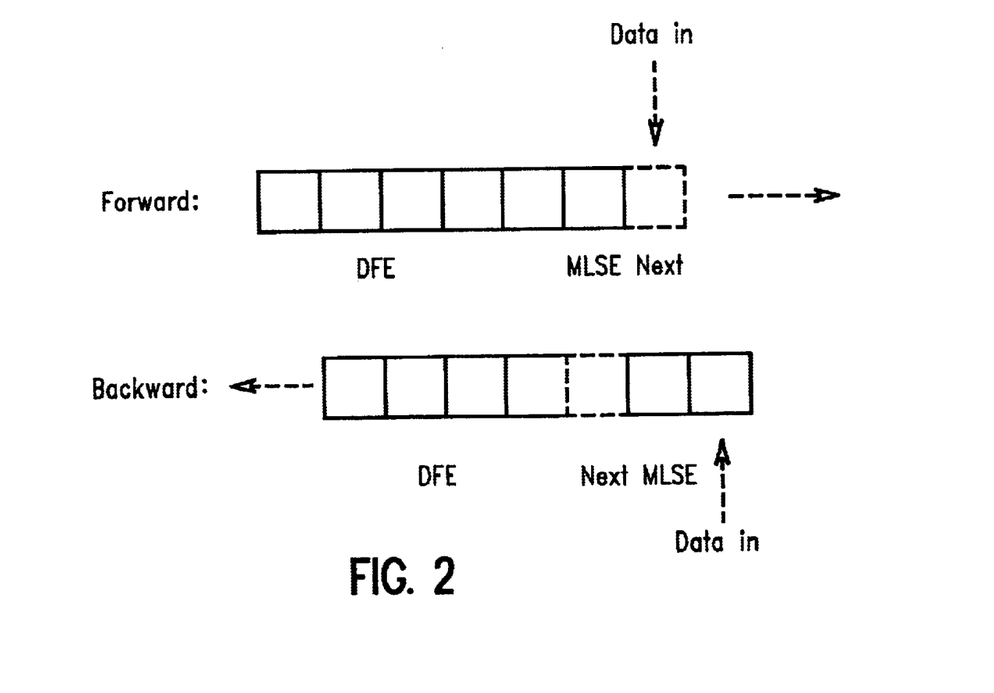
FIG. 2 illustrates state configurations for forward and backward recursions using an approach to combining DDFSE and Log-MAP algorithms in accordance with the invention.

The same reduced state space is used by the backward recursion. Using this structure, the decision feedback side information for the backward recursion is not associated with the surviving paths in the backward trellis, but rather is determined by the forward recursion to represent backward prediction symbols along each path. That is, as shown in FIG. 2, the DFE symbols appear on the left of the MLSE symbols for both forward and backward recursions, meaning that a minimum-phase channel is appropriate for both directions. Therefore, both directions can use the same prefilter and the two concerns described in the previous section no longer apply.

The disclosed invention generalizes the traditional BCJR paradigm to this reduced-state trellis, which is referred to as a DDF-Log-MAP (delayed decision feedback Log-MAP)

algorithm. The disclosed method has a forward-backward recursion structure similar to the classic Log-MAP algorithms. To reduce complexity, however, the forward recursion incorporates DDFSE to construct a reduced state space. The backward recursion then takes this state space as given, i.e., it does not hypothesize feedbacks, and computes the required soft information. The description includes exemplary applications of the invention to MPSK and M-ary differential phase-shift keying (MDPSK) modulations, respectively, with a reduced state space equivalent to that of a DDFSE with 2 MLSE taps. Generalizations to other modulations and other choices of reduced state spaces are straightforward.

Further features and advantages of the invention will be readily apparent from the specification and the drawings.

DETAILED DESCRIPTION OF THE INVENTION

In accordance with the invention, a DDFSE method is incorporated with the forward recursion to construct a reduced state space. Starting with a complete state space, the $M^L$ states are partitioned into $M^K$ subsets. Each of the subset consists of the $M^{(L-K)}$ states with the same K leading hypothesized symbols while the remaining L–K hypotheses would be completely different. Since the minimum-phase prefilter shifts most of the energy to the leading taps, the last L–K hypothesis have little effect on the recursion metrics. To reduce computation, L–K decision feedbacks are then used to select one representative state for each subset.

The same reduced state space is used by the backward recursion. The decision feedback side information for the backward recursion is not associated with the surviving paths in the backward trellis, but rather is determined by the forward recursion to represent backward prediction symbols along each path. That is, as shown in FIG. 2, the DFE symbols appear on the left of the MLSE symbols for both forward and backward recursions, meaning that a minimum-phase channel is appropriate for both directions. Therefore, both directions can use the same prefilter.

Figure 3:
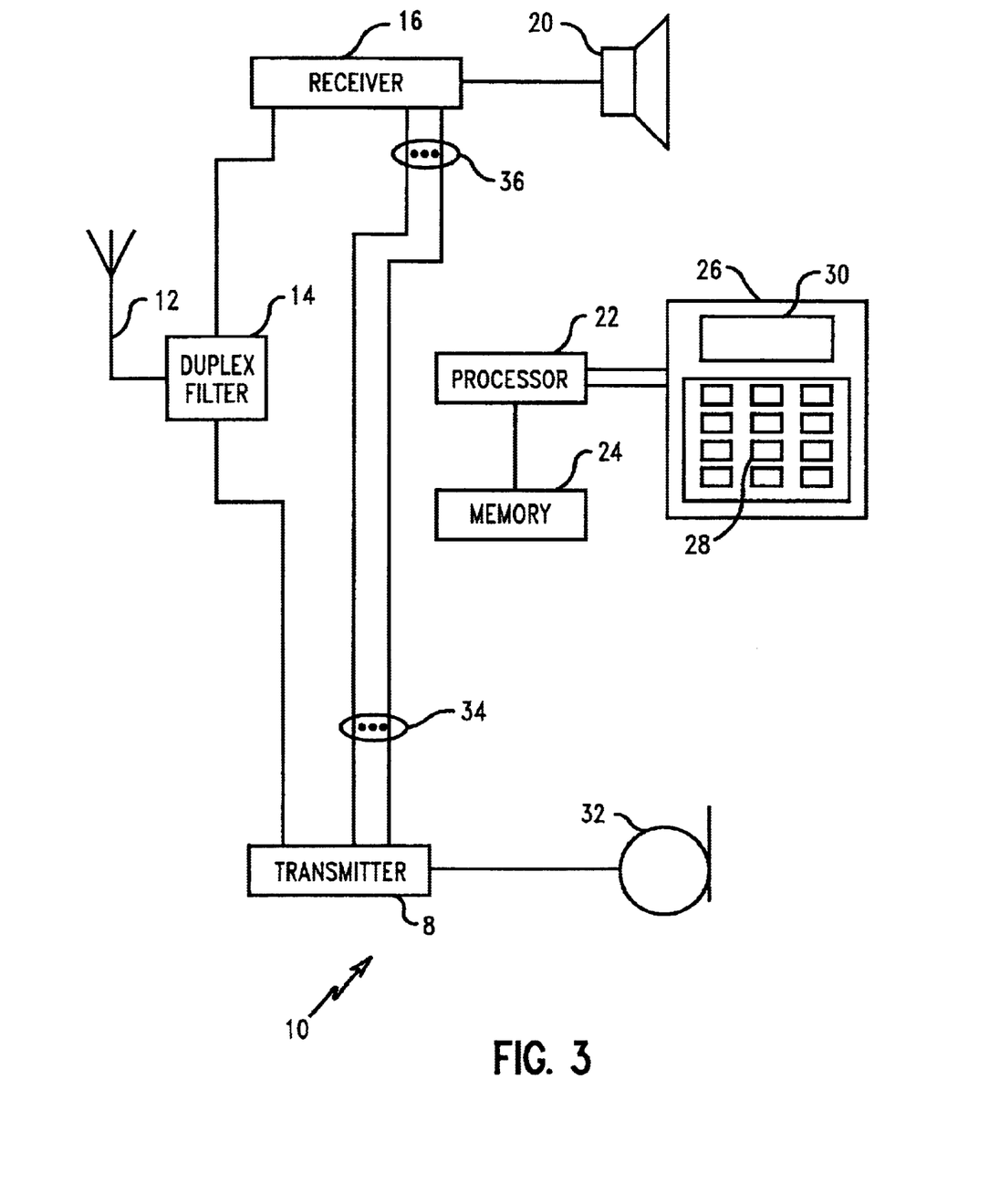
FIG. 3 is a block diagram of a mobile terminal implementing the method according to the invention.

FIG. 3 is a block diagram of a typical mobile terminal 10. The mobile terminal 10 includes an antenna 12, a receiver 16, a transmitter, 18, a speaker 20, a processor 22, a memory 24, a user interface 26 and a microphone 32. The antenna is configured to send and receive radio signals between the mobile terminal 10 and a wireless network (not shown). The antenna 12 is connected to a duplex filter 14 which enables the receiver 16 and the transmitter 18 to receive and broadcast (respectively) on the same antenna 12. The receiver 16, in conjunction with the processor 22, demodulates, demultiplexes and decodes the radio signals into one or more channels. Such channels include a control channel and a traffic channel for speech or data. The speech or data are delivered to the speaker 20 (or other output device, such as a modem or fax connector).

The receiver 16 delivers messages from the control channel to the processor 22. The processor 22 controls and coordinates the functioning of the mobile terminal 10 and is responsive to messages on the control channel using programs and data stored in the memory 24, so that the mobile terminal 10 can operate within the wireless network (not shown). The processor 22 also controls the operation of the mobile terminal 10 and is responsive to input from the user interface 26. The user interface 26 includes a keypad 28 as a user-input device and a display 30 to give the user information. Other devices are frequently included in the user interface 26, such as lights and special purpose buttons. The processor 22 controls the operations of the transmitter 18 and the receiver 16 over control lines 34 and 36, respectively, responsive to control messages and user input.

The microphone 32 (or other data input device) receives speech signal input and converts the input into analog electrical signals. The analog electrical signals are delivered to the transmitter 18. The transmitter 18 converts the analog electrical signals into digital data, encodes the data with error detection and correction information and multiplexes this data with control messages from the processor 22. The transmitter 18 modulates this combined data stream and broadcasts the resultant radio signals to the wireless network through the duplex filter 14 and the antenna 12.

While the present invention is described relative to a cellular communication system, the invention is applicable to other wireless communication systems having communication channels subject to intersymbol interference (ISI).

Figure 4:
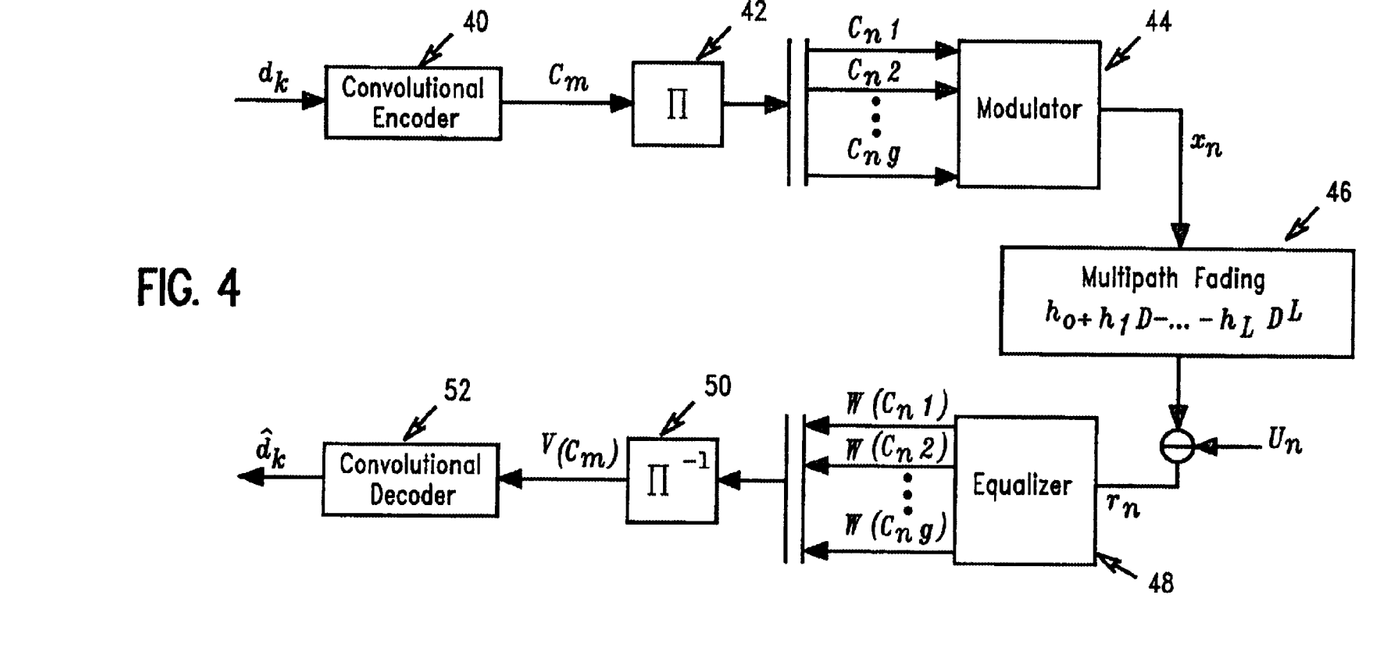
FIG. 4 is a block diagram of a system model for a wireless communication system implementing the method according to the invention.
Figure 5:
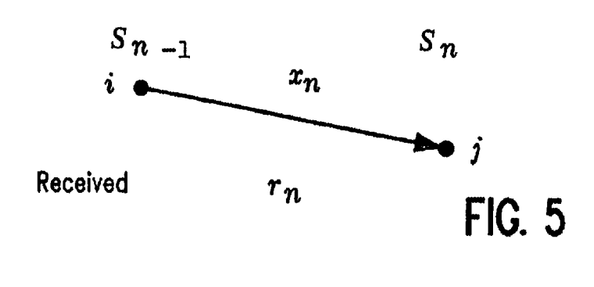
FIG. 5 illustrates trellis notation used in explaining the method according to the invention.

Digital cellular and personal communication systems based on IS-136 and GSM (global system for mobile communications) require equalization to handle ISI arising from time dispersion. With the advent of the high date rates and the high level modulation in EDGE (enhanced data rates for global evolution) systems, the extent of ISI has increased considerably. To cover the same delay spread as today's GSM, EDGE receivers are specified to resolve a 5-tap channel. Furthermore, these systems are convolutional coded, as illustrated in FIG. 4. To enable soft-decision decoding, it is, therefore, highly desirable for the equalizers to produce soft information at the bit level.

As illustrated in the system model of FIG. 4, data is input to a convolutional encoder 40. The encoded data is output through a channel interleaver 42 to a modulator 44. The modulator 44 modulates the bits in a conventional manner to produce a signal $x_n$ to be transmitted via a multipath fading channel represented at 46. A received sequence $r_n$ is input to an equalizer 48 in accordance with the invention to produce the soft information. The output of the equalizer 48 is delivered through a channel de-interleaver 50 to a convolutional decoder 52.

For n=1, 2, . . . , N the received sequence $r_n$ is related to the transmitted sequence $x_n$ by $$r_n = \sum_{l=0}^{L} h_l x_{n-l} + w_n, \quad (1)$$

where $h_l$, $l=0, 1, \ldots, L$, are complex-valued multipath fading coefficients and $w_n$ is complex-valued, zero-mean white Gaussian noise. As discussed above, to improve performance, minimum-phase pre-filtering can be used to maximize the energy in the leading coefficients, i. e., the energy in $h_l$ for small l.

For MPSK modulation, where $M=2_q$, the transmitted signal $x_n$ is uniquely specified by the input q-tuple, $(c_{n1}, c_{n2}, \ldots, c_{nq}) \in \{0,1\}^q$, via $$x_n = m_s = e^{j\frac{2\pi}{M}s},$$

where $s=c_1*2^{q-1}+c_2*2^{q-2}+\ldots+c_q$. A reverse q-ary to binary mapping is defined as $B_b(s)=c_b$, $b=1, 2, \ldots, q$.

For MDPSK modulation, where $M=2^q$, the transmitted signal $x_n$ is given by $$x_n = x_{n-1}*u_n, \quad (2)$$

where $u_n$ is an MPSK symbol uniquely specified by the input q-tuple, $(c_{n1}, c_{n2}, \ldots c_{nq}) \in \{0,1\}^q$, via $$x_n = m_s = e^{j\frac{2\pi}{M}s},$$

where $s=c_1*2^{q-1}+c_2*2^{q-2}+\ldots+c_q$. A reverse q-ary to binary mapping is defined as $B_b(s)=c_b$, $b=1,2,\ldots,q$.

The problem is to find, for all n and b, the a posteriori log-likelihood ratio of the bit $c_{nb}$:

$$\Lambda(c_{nb}) \triangleq \log \frac{Pr\{c_{nb}=1|r_1^N\}}{Pr\{c_{nb}=0|r_1^N\}} \quad (3)$$

given the complete received sequence $r_1^N=(r_1, r_2, \ldots r_N)$ and the a priori log-likelihood ratios $$V(c_{nb}) \triangleq \log \frac{Pr\{c_{nb}=1\}}{Pr\{c_{nb}=0\}}. \quad (4)$$

Using the traditional log-MAP algorithm, referring to the notations described in FIG. 4, the forward state metric (5), backward state metric (6), and the branch metric (7, 8) are defined as $$\alpha_n(j) = \log Pr\{S_n = j, r_1^n\} \quad (5)$$

$$\beta_n(j) = \log Pr\{r_{n+1}^N | S_n = j\} \quad (6)$$

$$\gamma_n(i, j) = \log Pr\{S_n = j, r_n | S_{n-1} = i\} \quad (7)$$

$$= \log Pr\{S_n = j | S_{n-1} = i\} + \log Pr\{r_n | S_{n-1} = i, S_n = j\}, \quad (8)$$

where $r_m^n$ represents the sequence $(r_m, r_{m+1}, \ldots, r_n)$. The forward and backward recursions are:

$$\alpha_n(j) = \underset{i}{COM}(\alpha_{n-1}(i) + \gamma_n(i, j)) \quad \text{for } n = 1, 2, \ldots, N \quad (9)$$

$$\beta_{n-1}(i) = \underset{j}{COM}(\beta_n(j) + \gamma_n(i, j)), \quad \text{for } n = N, N-1, \ldots, 1 \quad (10)$$

where the soft combining operation COM is defined as $$\underset{i}{COM}(x_i) \triangleq \log\left(\sum_i e^{x_i}\right). \quad (11)$$

Efficient implementation of this operation is given using:

$$COM(x,y)=\max(x,y)+\log(1+e^{-|x-y|}). \quad (12)$$

That is, the soft combiner first finds the maximum of the two inputs, as in the case for the Viterbi algorithm, and then adds a correction term. Many efficient implementations of this operation are discussed, for example, by P. Robertson, E. Villebrun and P. Hoehner, in "A Comparison of Optimal and Sub-Optimal MAP Decoding Algorithms Operating in the Log Domain," *Proceedings of IEEE International Communications Conference'95*, pp. 1009–1013, June 1995. One of the approach ignores the correction term completely to obtain a very computationally efficient algorithm, which is widely referred to as the Log-Max algorithm. The invention disclosed herein can be used in conjunction with any of these techniques.

If the trellis begins at known state B and ends at known state E, the two recursions are initialized by $$\alpha_0(j) = \begin{cases} \infty, & \text{for } j = B \\ 0, & \text{otherwise} \end{cases} \text{ and } \beta_N(j) = \begin{cases} \infty, & \text{for } j = E \\ 0, & \text{otherwise.} \end{cases} \quad (13)$$

where ∞ represents a very large number permitted by the processor 22 or a special symbol recognizable by the processor 22. The a posteriori state log-likelihood and the a posteriori edge log-likelihood from state i to state j at time n can be then computed as $$\log Pr\{S_n=j|r_1^N\}=\alpha_n(j)+\beta_n(j) \quad (14)$$

$$\log Pr\{S_{n-1}=i,S_n=j|r_1^N\}=\alpha_{n-1}(i)+\gamma_n(i,j)+\beta_n(j). \quad (15)$$

The following describes the use of DDF-Log-MAP for MPSK in accordance with the invention.

Under the structure of DDFSE with 2 MLSE taps, there are M states at each stage of the DDFSE trellis. Associated with each state $i=0, 1, \ldots, M-1$, at the (n−1)-th stage is a path history of L-tuple MPSK symbols corresponding to hypothesized transmitted signals from stage n−L to n−1:

$$P_i(\text{i n}-1)=[x_i(n-L), x_i(n-L+1) \ldots, x_i(\text{i n}-1)=m_i]. \quad (16)$$

For branch metrics, since all the paths that lead to the same end state j are driven by the same hypothesized symbol $m_j$, the first term of equation (8) is determined by:

$$\log Pr\{S_n = j | S_{n-1} = i\} = \log Pr\{x_n = m_j\} \quad (17)$$

$$= \sum_{b=1}^{q} \log Pr\{c_{nb} = B_b(j)\}$$

$$= \sum_{b=1}^{q} B_b(j)\log \frac{Pr\{c_{nb}=1\}}{Pr\{c_{nb}=0\}} +$$

-continued $$\sum_{b=1}^{q} \log Pr\{c_{nb} = 0\}$$

$$= \sum_{b=1}^{q} B_b(j) V(c_{nb}) + K'',$$

where $V(c_{nb})$ is the a priori log-likelihood ratio for the bit $c_{nb}$ and $B_b(j)$ is the q-ary to binary function defined above. For this equalizer, the second term of equation (8) can be written as:

$$\log Pr\{r_n | S_{n-1} = i, S_n = j\} = K' - \left| r_n - h_0 m_j - \sum_{l=1}^{L} h_l x_i(n-1) \right|^2 \quad (18)$$

$$= K - |\hat{r}_n(i)|^2 + 2\text{Re}\{h_0^* m_j^* \hat{r}_n(i)\},$$

where Re means taking the real part and $\hat{r}_n(i)$ is defined as $$\hat{r}_n(i) = r_n - \sum_{l=1}^{L} h_l x_i(n-l) \quad (19)$$

which is the estimated received signal after decision-feedback cancellation. The two terms, $$\sum_{l=1}^{L} h_l x_i(n-l)$$

and $2\text{Re}\{h_0^* m_j^* \hat{r}_n(i)\}$, can be efficiently computed by, for example, techniques discussed in application Ser. No. 09/499,977, entitled "Methods, Receivers and Equalizers Having Increased Computation Efficiency" to K. C. Zangi et al. and filed Feb. 8, 2000, which is incorporated by reference herein.

For the forward recursion, since $$\underset{i}{COM}(a + x_i) = a + \underset{i}{COM}(x_i),$$

the n-th stage of the forward recursion can then be re-arranged as $$\alpha_n(j) = \underset{i=0}{\overset{M-1}{COM}}\left(\alpha_{n-1}(i) - |\hat{r}_n(i)|^2 + 2\text{Re}\{h_0^* m_j^* \hat{r}_n(i)\}\right) + \sum_{b=1}^{q} B_b(j) V(c_{nb}). \quad (20)$$

For the decision feedback update, the new path history for state j is defined as $$P_j(n) = [x_s(n-L+1), \ldots x_s(n-2), m_s, m_j], \quad (21)$$

where s is the index of the prior state from which the surviving branch is originated and:

$$s = \underset{i=0,\ldots,M-1}{\max^{-1}} \left( \alpha_{n-1}(i) - |\hat{r}_n(i)|^2 + 2\text{Re}\{h_0^* m_j^* \hat{r}_n(i)\} \right). \quad (22)$$

That is, the surviving branch into state j is defined as the branch ending at j with the maximum accumulated metric $$(\alpha_{n-1}(i) - |\hat{r}_n(i)|^2 + 2Re\{h_0^* m_j^* \hat{r}n(i)\}). \quad (23)$$

Since finding the maximum is part of the COM operation, the last expression does not incur any new complexity.

For the backward recursion, the (n−1)-th stage can be re-arranged as:

$$\beta_{n-1}(i) = \underset{j=0}{\overset{M-1}{COM}}\left(\beta_n(j) + \sum_{b=1}^{q} B_b(j) V(c_{nb}) + 2\text{Re}\{h_0^* m_j^* \hat{r}_n(i)\}\right) - |\hat{r}_n(i)|^2. \quad (24)$$

That is, the backward recursion does not hypothesize feedbacks and instead re-uses the modified received sequence $\hat{r}_n(i)$ computed by the forward recursion.

For the soft output, the a posteriori log-likelihood ratio of the bit $c_{nb}$ is then given by $$\Lambda(c_{nb}) = \underset{s:B_b(s)=1}{COM} (\alpha_n(s) + \beta_n(s)) - \underset{s':B_b(s')=0}{COM} (\alpha_n(s') + \beta_n(s')). \quad (25)$$

That is, for each b=1, 2, . . . , q, the a posteriori state log-likelihoods $(\alpha_n(s)+\beta_n(s))$, for s=0, 1, . . . , M−1, are first separated into two sets such that one set has the b-th position in the binary representation of s being 1 and the other set has that position being 0. These two sets of log-likelihoods are then processed by the soft combiner separately. Finally, the a posteriori log-likelihood for bit $c_{nb}$ is obtained by taking the difference of the two combined results. The extrinsic information for the bit $c_{nb}$ can be obtained as $$W(c_{nb}) = \Lambda(c_{nb}) - V(c_{nb}). \quad (26)$$

The above described method is formulated to execute the forward recursion first and then backward recursion in the above. It is straightforward to generalize it to execute the backward recursion first and followed by the forward recursion.

Using proper implementations for the COM operations and techniques to compute $$\sum_{l=1}^{L} h_l x_i(n-l)$$

and $2\text{Re}\{h_0^* m_j^* \hat{r}_n\}(i)$, the disclosed method is comparable to the traditional or SOVA-type DDFSE in total computational complexity. However, in addition to those variables generally used in MLSE or DDFSE equalizers, the disclosed method stores the forward state metrics $\alpha_n(j)$ if the forward recursion is executed before the backward recursion. If the backward recursion is executed before the forward recursion, then the backward state metrics $\beta_n(i)$ are stored. For systems with small blocks, e. g., D-AMPS, this storage requirement is not too excessive. For systems with large blocks, the disclosed method can be applied in a sliding-window style as discussed by, for example, S. Benedetto, G. Montorsi, D. Divsalar and F. Pollara in "Soft-Output Decoding Algorithms in Iterative Decoding of Turbo Codes," *The Telecommuinications and Data Acquisition Progress Report*, Jet Propulsion Laboratory, California Institute of Technology, vol. 42–124, pp. 63–87, February 1996, to reduce the required storage size.

The following describes the use of DDF-Log-MAP for MDPSK in accordance with the invention.

Under the structure of DDFSE with 2 MLSE taps, there are M states at each stage of the DDFSE trellis. Associated with each state i=0, 1, . . . , M−1, at the (n−1)-th stage is a path history of L-tuple MPSK symbols corresponding to hypothesized transmitted signals from stage n−L to n−1:

$$P_i(n-1) = [x_i(n-L), x_i(n-L+1) \ldots, x_i(n-2), x_i(n-1) = m_i]. \quad (27)$$

For branch metrics, because of the differential encoding, the transition from state i to state j is driven by $u_n = m_\delta$, where $\delta \in \{0, 1, \ldots, M-1\}$ is obtained by $$\delta = (i-j)_M \triangleq (i-j) \bmod M. \tag{28}$$

where mod is the modulo operation. Therefore, the first term of equation (8) can be computed as $$\log Pr\{S_n = j \mid S_{n-1} = i\} = \log Pr\{u_n = m_\delta\} \tag{29}$$

$$= \sum_{b=1}^{q} \log Pr\{c_{nb} = B_b(\langle i-j \rangle_M)\}$$

$$= \sum_{b=1}^{q} B_b(\langle i-j \rangle_M) \log \frac{Pr\{c_{nb}=1\}}{Pr\{c_{nb}=0\}} +$$

$$= \sum_{b=1}^{q} \log Pr\{c_{nb} = 0\}$$

$$= \sum_{b=1}^{q} B_b(\langle i-j \rangle_M) V(c_{nb}) + K'',$$

where $V(c_{nb})$ is the a priori log-likelihood ratio for the bit $c_{nb}$ and $B_b$ is the q-ary to binary function defined above. Note that $$\sum_{b=1}^{q} B_b(\langle i-j \rangle_M) V(c_{nb})$$

can only assume one of the following M values:

$$\sum_{b=1}^{q} B_b(\delta) V(c_{nb}) = \sum_{b: B_b(\delta)=1} V(c_{nb}), \quad \delta = 0, 1, \ldots, M-1 \tag{30}$$

which can be pre-computed using only $$\left[(q-2)\frac{M}{2} + 1\right]$$

real additions.

Since all paths that lead to the same end state j hypothesize the same transmitted symbol $m_j$, for this equalizer, the second term of equation (8) can be computed as:

$$\log Pr\{r_n \mid S_{n-1} = i, S_n = j\} = \tag{31}$$

$$K' - \left| r_n - h_0 m_j - \sum_{l=1}^{L} h_l x_i(n-l) \right|^2 = K - |\hat{r}_n(i)|^2 + 2\text{Re}\{h_0^* m_j^* \hat{r}_n(i)\},$$

where Re means taking the real part and $\hat{r}_n(i)$ is defined as $$\hat{r}_n(i) = r_n - \sum_{l=1}^{L} h_l x_i(n-l) \tag{32}$$

which is the estimated received signal after decision-feedback cancellation. The two terms, $$\sum_{l=1}^{L} h_l x_i(n-l)$$

and $2\text{Re}\{h_0^* m_j^* \hat{r}_n(i)\}$, can be efficiently computed by, for example, techniques discussed in the aforementioned reference incorporated herein.

For the forward recursion, the n-th stage can then be formulated as $$\alpha_n(j) = \tag{33}$$

$$\underset{i=0}{\overset{M-1}{COM}}\left(\left(\alpha_{n-1}(i) - |\hat{r}_n(i)|^2 + 2\text{Re}\{h_0^* m_j^* \hat{r}_n(i)\} + \sum_{b=1}^{q} B_b(\langle i-j \rangle_M) V(c_{nb})\right)\right).$$

For the decision feedback update, the new path history for state j is defined as $$P_j(n) = [x_s(n-L+1), \ldots, x_s(n-2), m_s, m_j], \tag{34}$$

where s is the index of the prior state from which the surviving branch is originated and:

$$s = \max_{i=0,\ldots,M-1}^{-1}\left((\alpha_{n-1}(i) - |\hat{r}_n(i)|^2) + \right. \tag{35}$$

$$\left. 2\text{Re}\{h_0^* m_j^* \hat{r}_n(i)\} + \sum_{b=1}^{3} B_b(\langle i-j \rangle_M) V(c_{nb})\right).$$

That is, the surviving branch into state j is defined as the branch ending at j with the maximum accumulated metric $$\left((\alpha_{n-1}(i) - |\hat{r}_n(i)|^2) + 2\text{Re}\{h_0^* m_j^* \hat{r}_n(i)\} + \sum_{b=1}^{3} B_b(\langle i-j \rangle_M) V(c_{nb})\right). \tag{36}$$

Since finding the maximum is part of the COM operation, the last expression does not incur any new complexity.

For the backward recursion, since $$\underset{i}{COM}(a + x_i) = a + \underset{i}{COM}(x_i),$$

the (n−1)-th stage of the backward recursion can be rearranged as:

$$\beta_{n-1}(i) = \tag{37}$$

$$\underset{j=0}{\overset{M-1}{COM}}\left(\beta_n(j) + \sum_{b=1}^{3} B_b(\langle i-j \rangle_M) V(c_{nb}) + 2\text{Re}\{h_0^* m_j^* \hat{r}_n(i)\}\right) - |\hat{r}_n(i)|^2.$$

That is, the backward recursion does not hypothesize feedbacks and instead re-uses the modified received sequence $\hat{r}_n(i)$ computed by the forward recursion.

For the soft output, the a posteriori log-likelihood ratio of the bit $c_{nb}$ is then given by $$\Lambda(c_{nb}) = \underset{i,j:B_b(\langle i-j \rangle_M)=1}{COM}(\alpha_{n-1}(i) + \gamma_n(i,j) + \beta_n(j)) - \tag{38}$$

$$\underset{i,j:B_b(\langle i-j \rangle_M)=0}{COM}(\alpha_{n-1}(i) + \gamma_n(i,j) + \beta_n(j))$$

where $\gamma_n(i,j)$ as defined in equation (8) is simply the sum of equations (29) and (31). That is, the $M^2$ a posteriori edge log-likelihoods can be computed as $(\alpha_{n-1}(i)+\gamma_n(i,j)+\beta_n(j))$, for each $i=0, 1, \ldots, M-1$ and $j=0, 1, \ldots, M-1$. For each $b=1, 2, \ldots, q$, these log-likelihoods are first separated into two sets such that one set has the b-th position in the binary representation of (i–j) being 1 and the other set has that position being 0. These two sets of log-likelihoods are then processed by the soft combiner separately. Finally, the a posteriori log-likelihood for bit $c_{nb}$ is obtained by taking the difference of the two combined results.

It should be noted that the computational complexity of equation (38) can actually be reduced by first computing the a posteriori log-likelihoods of the driving symbol $u_n$ and then deriving the bit log-likelihoods from these symbol log-likelihoods. For M=8, this two-step approach can reduce the complexity of equation (38) by 60%.

This method is demonstrated in the following. First, the M driving symbol log-likelihoods are obtained as:

$$\Gamma_n(\delta) = \mathop{COM}_{i=0}^{M-1}(\alpha_{n-1}(i) + \gamma_n(i, \langle i+\delta\rangle_M) + \beta_n(\langle i+\delta\rangle_M)), \quad (39)$$

for $\delta=0, 1, \ldots, M-1$. The a posteriori log-likelihood for bit $c_{nb}$ can then be computed using $$\Lambda(c_{nb}) = \mathop{COM}_{\delta:B_b(\delta)=1}(\Gamma_n(\delta)) - \mathop{COM}_{\delta:B_b(\delta)=0}(\Gamma_n(\delta)). \quad (40)$$

That is, for each $b=1, 2, \ldots, q$, these symbol log-likelihoods are first separated into two sets such that one set has the b-th position in the binary representation of $\delta$ being 1 and the other set has that position being 0. These two sets of log-likelihoods are then processed by the soft combiner separately. Finally, the a posteriori log-likelihood for bit $c_{nb}$ is obtained by taking the difference of the two combined results.

The extrinsic value for bit c,b can be obtained as $$W(c_{nb}) = \Lambda(c_{nb}) - V(c_{nb}). \quad (41)$$

Similar to the DDF-Log-MAP method for MPSK equalization discussed above, the disclosed method for MDPSK equalization can also be generalized to execute the backward recursion first and followed by the forward recursion. Similar comments on complexity from that discussion apply to the MDPSK equalization method as well.

Figure 6:
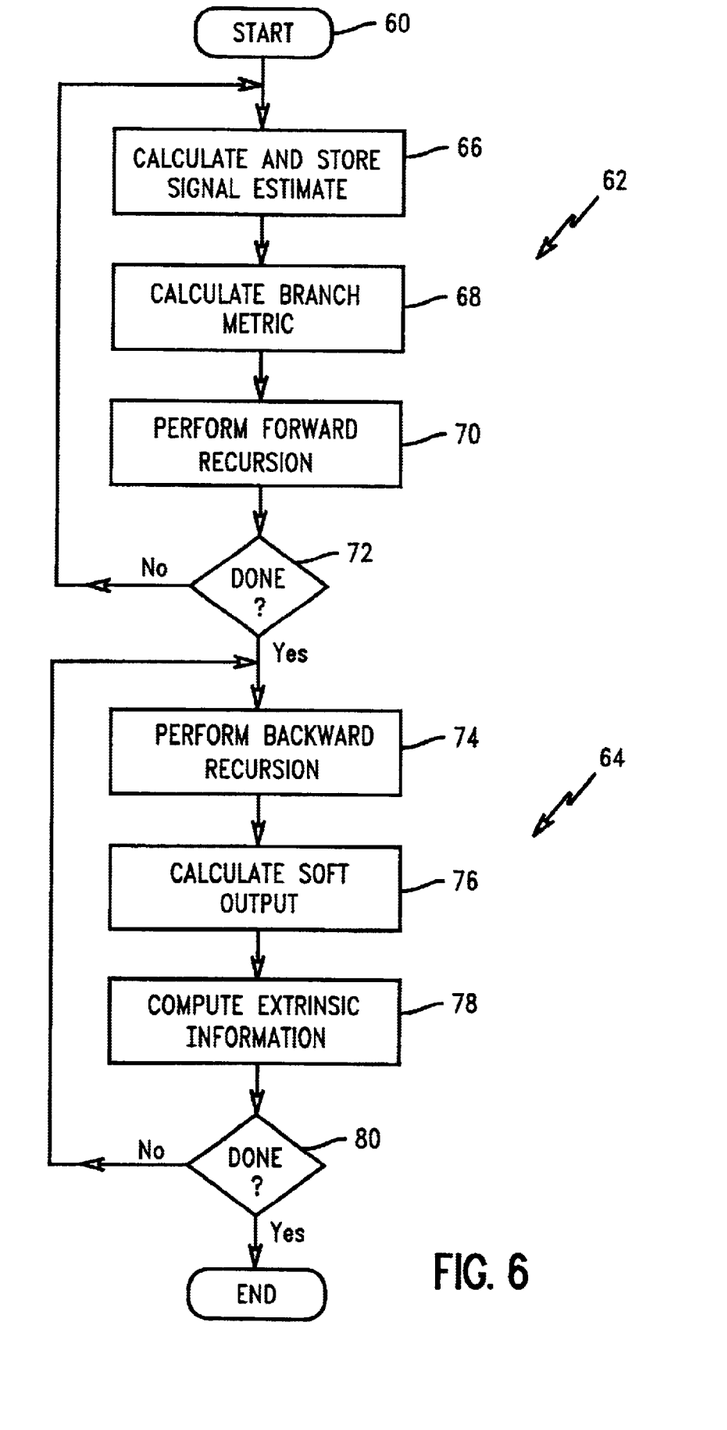
FIG. 6 is a flow diagram illustration of a program run by the processor of FIG. 3 to implement the method according to the invention.

Referring to FIG. 6, a flow diagram illustrates a program implemented in the processor 22 of FIG. 3 for implementing the method of delayed decision feedback Log-MAP equalization in accordance with the invention. As will be apparent, the equalization method is done in coordination with hardware in the receiver 16 of FIG. 3. In describing the method, reference will be made to equations for both MPSK and, in parenthesis, MDPSK.

The program begins at a start node 60 when a signal is received. The program has a first loop 62 performing the forward recursion for $n=1, 2, \ldots N$ and, for each n, $j=0, 1, \ldots M-1$. A second loop 64 performs the backward recursion for $n=N, N-1, \ldots 1$ and, for each n, $i=0, 1, \ldots M-1$.

The first loop 62 begins at a block 66 that calculates and stores the received signal estimate using equation 19 (32) based on the path history from equation 16 (27). Then, at a block 68, the branch metric is calculated using equations 17 and 18 (29 and 31). Finally, at a block 70, the forward recursion is performed. The forward recursion implements equation 20 (33) and then for each state j updates the path history of equation 21 (34) using equation 22 (35). A decision block 72 loops back to the block 66 until the loop 62 completes a forward trellis for all n and j and the estimated received signal values, forward metrics and path histories are stored in memory 24, see FIG. 3, for each state and time. Thereafter, the second loop 64 is performed to run a backward trellis.

The second loop 64 begins at a block 74 that performs the backward recursion. The backward recursion implements equation 24 (37) for each state i. Then, at a block 76, the soft output is calculated by determining the a posteriori log likelihood ratio using equation 25 (38 or 39 and 40). Finally, extrinsic information is obtained for each bit at a block 78 using equation 26 (41). A decision block 80 loops back to the block 74 until the loop 64 completes the backward trellis for all n and i. The routine is then done.

As is apparent, to implement the backward recursion first the functions of blocks 70 and 74 would be reversed.

Thus, in accordance with the invention, an efficient method generates optimal soft information at the bit level for MPSK and MDPSK modulations over multipath fading channels. The algorithms have a forward-backward recursion structure similar to conventional Log-MAP algorithms. To reduce complexity, the forward recursion incorporates the techniques of DDFSE to construct a reduced state space. The backward recursion then takes this state space as given, in that it does not hypothesize feedbacks, and computes required soft information.

What is claimed is:

1. A method for detecting symbols in a received signal in the presence of intersymbol interference, the method comprising:
   performing a forward recursion using a first Viterbi decoder and, at each stage of the forward recursion:
      selecting forward survivor states; and
      computing a forward state metric for each selected forward survivor state;
   performing a backward recursion using a second Viterbi decoder and, at each stage of the backward recursion:
      selecting backward survivor states; and
      computing a backward state metric for each selected backward survivor state; and
   computing soft values for symbols in the received signal by combining the forward state metrics and the backward state metrics;
   canceling, during the forward recursion, intersymbol interference in the received signal using estimated symbols output by the first Viterbi decoder during the forward recursion; and
   canceling, during the backward recursion, intersymbol interference using the estimated symbols output by the first Viterbi decoder during the forward recursion.

2. The method of claim 1 wherein the estimated symbols output by the first Viterbi decoder during the forward recursion select the survivor states.

3. The method of claim 2 wherein the survivor states selected during the backward recursion are constrained to be the same as the survivor states selected during the forward recursion.

4. The method of claim 1 further comprising pre-filtering the received signal input to the first and second Viterbi decoders.

5. The method of claim 1 wherein pre-filtering the received signal input to the first and second Viterbi decoders comprises using the same filter to pre-filter the received signal for both the forward and backward recursions.

6. The method of claim 5 wherein the pre-filter is an anti-causal filter to create a minimum phase-channel response.

7. The method of claim 1 wherein the received signal comprises differentially coded symbols.

8. The method of claim 1 wherein the received signal comprises PSK modulated symbols.

9. An equalizer implemented in a digital signal processor for detecting received signals in the presence of intersymbol interference, the equalizer comprising:
- a first Viterbi decoder to perform a forward recursion and, at each stage of the forward recursion to:
  - select forward survivor states; and
  - compute a forward state metric for each selected forward survivor state;
- a second Viterbi decoder to perform a backward recursion and, at each stage of the backward recursion:
  - select backward survivor states; and
- a metric calculator to compute soft values for symbols in the received signal by combining the forward state metrics and the backward state metrics;
- a processor to cancel intersymbol interference in the received signal input to the first Viterbi decoder during the forward recursion using estimated symbols output by the first Viterbi decoder during the forward recursion; and
- a processor to cancel intersymbol interference in the received signal input to the second Viterbi decoder during the backward recursion using the estimated symbols output by the first Viterbi decoder during the forward recursion.

10. The equalizer of claim 9 wherein the first Viterbi decoder constructs a state space during the forward recursion.

11. The equalizer of claim 10 wherein the first Viterbi decoder selects the survivor states for a current symbol based on previous symbol estimates output by the first Viterbi decoder.

12. The equalizer of claim 10 wherein the second Viterbi decoder uses the same state space constructed during the forward recursion by the first Viterbi decoder.

13. The equalizer of claim 9 further comprising a pre-filter for each of the first and second Viterbi decoders.

14. The equalizer of claim 13 wherein the same pre-filter is used for both the first and second Viterbi decoders.

15. The equalizer of claim 14 wherein the pre-filter is an anti-causal filter to create a minimum phase-channel response.

16. The equalizer of claim 9 wherein the received signal comprises differentially coded symbols.

17. The equalizer of claim 9 wherein the received signal comprises PSK modulated symbols.

* * * * *